United States Patent
Nagamine et al.

(10) Patent No.: US 10,182,081 B2
(45) Date of Patent: Jan. 15, 2019

(54) CONTROL SYSTEM, COMMUNICATION SYSTEM, CONTROL METHOD, AND RECORDING MEDIUM

(71) Applicants: Shoh Nagamine, Kanagawa (JP); Takuya Imai, Tokyo (JP); Kenichiro Morita, Tokyo (JP); Hideki Shiro, Kanagawa (JP)

(72) Inventors: Shoh Nagamine, Kanagawa (JP); Takuya Imai, Tokyo (JP); Kenichiro Morita, Tokyo (JP); Hideki Shiro, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 350 days.

(21) Appl. No.: 15/018,352

(22) Filed: Feb. 8, 2016

(65) Prior Publication Data

US 2016/0248819 A1  Aug. 25, 2016

(30) Foreign Application Priority Data

Feb. 19, 2015 (JP) .................. 2015-030762

(51) Int. Cl.
*H04L 29/06* (2006.01)
*H04N 7/15* (2006.01)
*H04L 12/18* (2006.01)

(52) U.S. Cl.
CPC ...... *H04L 65/1069* (2013.01); *H04L 12/1822* (2013.01); *H04L 65/1046* (2013.01); *H04N 7/15* (2013.01)

(58) Field of Classification Search
CPC ............. H04L 65/1046; H04L 65/1069; H04L 12/1822; H04N 7/15
See application file for complete search history.

(56) References Cited

U.S. PATENT DOCUMENTS 4,975,944 A 12/1990 Cho
5,537,470 A 7/1996 Lee
(Continued)

FOREIGN PATENT DOCUMENTS

EP 1 564 977 A2 8/2005
EP 1 903 763 A1 3/2008
(Continued)

OTHER PUBLICATIONS

Extended European Search Report dated Dec. 13, 2017 in Patent Application No. 16737341.4, 8 pages.
(Continued)

*Primary Examiner* — Davoud A Zand
(74) *Attorney, Agent, or Firm* — Oblon, McClelland, Maier & Neustadt, L.L.P.

(57) ABSTRACT

A control system is provided. The control system includes a state management unit configured to control state information indicating a state of a communication terminal and a control unit configured to, when a first communication terminal and a second communication terminal communicate, determine whether content data should be transmitted from the first communication terminal to the second communication terminal and whether content data should be transmitted from the second communication terminal to the first communication terminal based on a set of the state information indicating the state of the first communication terminal and the state information indicating the state of the second communication terminal controlled by the state management unit.

10 Claims, 12 Drawing Sheets

(56) References Cited

U.S. PATENT DOCUMENTS

| | | |
|---|---|---|
| 6,002,760 A | 12/1999 | Gisby |
| 6,975,721 B1 | 12/2005 | Nimri et al. |
| 8,503,313 B1 | 8/2013 | Lang et al. |
| 8,630,208 B1 | 1/2014 | Kjeldaas |
| 8,769,001 B2 | 7/2014 | Ohwada |
| 8,782,229 B2 | 7/2014 | Umehara |
| 8,850,033 B2 | 9/2014 | Umehara et al. |
| 9,043,399 B2 | 5/2015 | Umehara |
| 9,185,344 B2 | 11/2015 | Inoue |
| 9,635,565 B2 * | 4/2017 | Futaki .................. H04W 24/02 |
| 9,693,080 B2 * | 6/2017 | Kasatani .............. H04N 19/172 |
| 2002/0045449 A1 * | 4/2002 | Oobayashi ............ H04W 36/30 455/436 |
| 2003/0031161 A1 * | 2/2003 | Froehlich .............. H04L 1/1832 370/349 |
| 2003/0110408 A1 | 6/2003 | Wells et al. |
| 2003/0195979 A1 * | 10/2003 | Park ...................... H04L 1/0006 709/231 |
| 2004/0196856 A1 | 10/2004 | Bondarenko et al. |
| 2005/0182672 A1 | 8/2005 | Hemm et al. |
| 2005/0254440 A1 * | 11/2005 | Sorrell .............. H04L 29/06027 370/264 |
| 2006/0030300 A1 | 2/2006 | Nimri et al. |
| 2006/0153240 A1 * | 7/2006 | Kikuma ................ H04W 28/06 370/474 |
| 2007/0015536 A1 | 1/2007 | Labauve et al. |
| 2008/0037764 A1 | 2/2008 | Lee et al. |
| 2009/0129295 A1 | 5/2009 | Shibata et al. |
| 2009/0154411 A1 * | 6/2009 | Kikuchi ............... H04B 7/0417 370/329 |
| 2009/0203375 A1 | 8/2009 | Gisby et al. |
| 2010/0177735 A1 * | 7/2010 | Bihannic ............ H04N 21/2381 370/331 |
| 2010/0259593 A1 | 10/2010 | Beers et al. |
| 2010/0262712 A1 * | 10/2010 | Kim ............... H04N 21/234327 709/231 |
| 2010/0290614 A1 | 11/2010 | Geppert et al. |
| 2011/0063407 A1 | 3/2011 | Wang |
| 2012/0027194 A1 | 2/2012 | Deshpande et al. |
| 2012/0188890 A1 * | 7/2012 | Tabata .................. H04B 17/23 370/252 |
| 2012/0221702 A1 | 8/2012 | Umehara et al. |
| 2012/0257518 A1 | 10/2012 | Erhart et al. |
| 2012/0296494 A1 | 11/2012 | Gersabeck et al. |
| 2014/0033274 A1 | 1/2014 | Okuyama |
| 2015/0350446 A1 | 12/2015 | Glass et al. |
| 2016/0105638 A1 | 4/2016 | Pai et al. |
| 2016/0112562 A1 | 4/2016 | Krack et al. |
| 2016/0127684 A1 | 5/2016 | Hanson et al. |
| 2017/0163696 A1 | 6/2017 | Inoue |

FOREIGN PATENT DOCUMENTS

| | | |
|---|---|---|
| EP | 2 288 152 A1 | 2/2011 |
| EP | 3 032 811 A1 | 6/2016 |
| JP | 7-38870 A | 2/1995 |
| JP | 09-179907 A | 7/1997 |
| JP | 2003-125094 A | 4/2003 |
| JP | 2005-64860 A | 3/2005 |
| JP | 2006-59131 A | 3/2006 |
| JP | 2009-223533 A | 10/2009 |
| JP | 2011-205612 A | 10/2011 |
| JP | 2011-217213 A | 10/2011 |
| JP | 2011-217261 A | 10/2011 |
| JP | 2012-50063 A | 3/2012 |
| JP | 2012-191598 A | 10/2012 |
| JP | 2014-27433 A | 2/2014 |
| JP | 2014-38522 A | 2/2014 |
| JP | 2014-57127 A | 3/2014 |
| JP | 2014-143534 A | 8/2014 |
| WO | 2015/019792 A1 | 2/2015 |
| WO | WO 2015/190368 A1 | 12/2015 |
| WO | WO 2016/035551 A1 | 3/2016 |

OTHER PUBLICATIONS

Office Action dated Aug. 17, 2017 in co-pending U.S. Appl. No. 15/015,417.
Extended European Search Report dated May 31, 2016 in Patent Application No. 16154013.3.
Extended European Search Report dated Jul. 5, 2016 in European Patent Application No. 16155668.3.
Extended European Search Report dated Jun. 20, 2017 in Patent Application No. 15824790.8.
International Search Report dated Oct. 20, 2015 in PCT/JP2015/070613 (with English language translation).
International Search Report dated Oct. 6, 2015 in PCT/JP2015/070614 (with English language translation).
International Search Report dated Mar. 29, 2016 in PCT/JP2016/050743 (with English language translation).
Extended European Search Report dated Jul. 4, 2017 in Patent Application No. 15825032.4.
Office Action dated Jan. 8, 2018 in co-pending U.S. Appl. No. 15/649,174, 10 pages
Article 94(3) EPC Communication issued in corresponding European Application No. 16 155 668.3 dated Sep. 17, 2018.

* cited by examiner

FIG.7A

| COMMUNICATION ID | DESTINATION NAME (TERMINAL NAME) | STATE INFORMATION |
|---|---|---|
| 01aa | TERMINAL AA | NONE |
| 01da | TERMINAL DA | NONE |
| 01db | TERMINAL DB | NONE |
| ... | ... | ... |

FIG.7B

| SESSION ID | RELAY APPARATUS ID | PARTICIPATING TERMINAL COMMUNICATION ID |
|---|---|---|
| se01 | 111e | 01aa, 01db |
| ... | ... | ... |

FIG.7C

| STATE INFORMATION OF FIRST TERMINAL | STATE INFORMATION OF SECOND TERMINAL | TRANSMISSION AVAILABILITY INFORMATION | QUALITY INFORMATION |
|---|---|---|---|
| CALLING | RECEIVING | ONLY TRANSMISSION FROM FIRST TERMINAL TO SECOND TERMINAL IS AVAILABLE | LOW |
| CALLING | TRANSFERRING | ONLY TRANSMISSION FROM FIRST TERMINAL TO SECOND TERMINAL IS AVAILABLE | LOW |
| CALLING | RESPONDING | BIDIRECTIONAL TRANSMISSION IS AVAILABLE | LOW |
| TRANSFERRING | RECEIVING | BIDIRECTIONAL TRANSMISSION IS AVAILABLE | LOW |
| RESPONDING | TRANSFERRING | BIDIRECTIONAL TRANSMISSION IS AVAILABLE | LOW |
| RESPONDING | RECEIVING | ONLY TRANSMISSION FROM FIRST TERMINAL TO SECOND TERMINAL IS AVAILABLE | LOW |
| CONFERENCING | CONFERENCING | BIDIRECTIONAL TRANSMISSION IS AVAILABLE | HIGH |
| ... | ... | ... | ... |

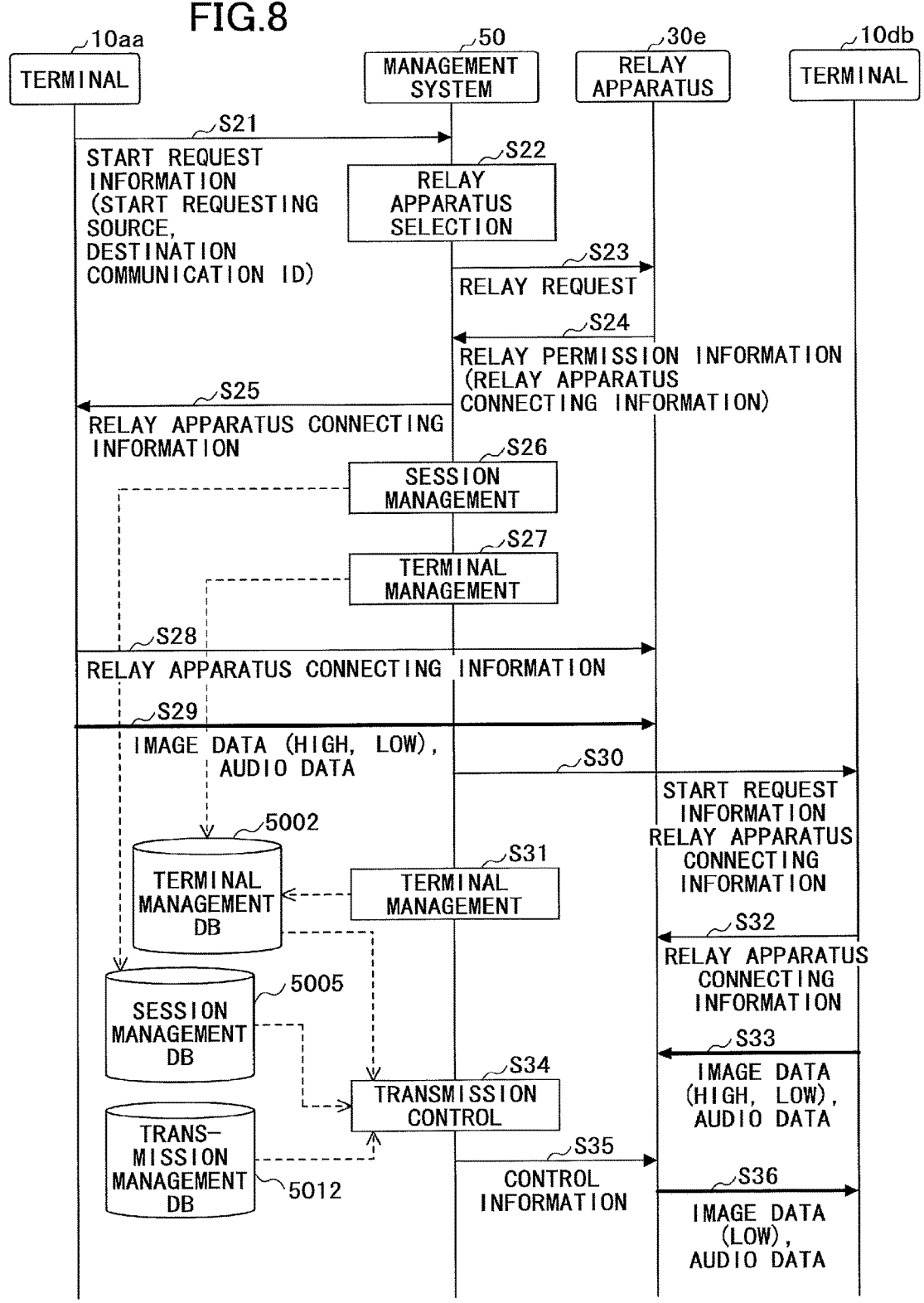

CONTROL SYSTEM, COMMUNICATION SYSTEM, CONTROL METHOD, AND RECORDING MEDIUM

BACKGROUND OF THE INVENTION

1. Field of the Invention

The present invention relates to a control system, a communication system, a control method, and a recording medium.

2. Description of the Related Art

In recent years, along with, for example, a request for reducing the cost and time of travel of people, a communication system which provides calls and conferences over the communication network of the Internet or a dedicated line or the like have become popular. In this kind of communication system, when communications between communication terminals are started, content data such as image data and audio data is sent and received, and thus, the communications between the sites are realized.

Further, a communication system is used in a reception desk work. For example, Patent Document 1 describes a remote reception desk system in which, in the case where an interactive service is provided for a plurality of reception desks by using a video phone, it is possible to switch the reception desk that is connected to the video phone.

However, according to a conventional communication system, when communication between communication terminals is started, content data transmission is started in both directions simultaneously. In other words, there is a problem in that a start timing of content data transmission from a first communication terminal to a second communication terminal cannot be different from a start timing of content data transmission from the second communication terminal to the first communication terminal.

CITATION LIST

Patent Document

[Patent Document 1] Japanese Laid-Open Patent Application No. H9-179907

SUMMARY OF THE INVENTION

A control system according to an embodiment of the present invention includes a state management unit configured to control state information indicating a state of a communication terminal and a control unit configured to, when a first communication terminal and a second communication terminal communicate, determine whether content data should be transmitted from the first communication terminal to the second communication terminal and whether content data should be transmitted from the second communication terminal to the first communication terminal based on a set of the state information indicating the state of the first communication terminal and the state information indicating the state of the second communication terminal controlled by the state management unit.

According to an embodiment of the present invention, there is an advantage in that it is possible to make a start timing of content data transmission from one communication terminal to the other communication terminal be different from a start timing of content data transmission from the other communication terminal to the one communication terminal.

Other objects, features and advantages of the present invention will become more apparent from the following detailed description when read in conjunction with the accompanying drawings.

BRIEF DESCRIPTION OF THE DRAWINGS

FIG. 7A is a conceptual diagram of a terminal management table managed by a management system.

FIG. 7B is a conceptual diagram of a session management table managed by the management system.

FIG. 7C is a conceptual diagram of a transmission management table managed by the management system.

FIG. 8 is a sequence diagram illustrating a process of calling a destination terminal.

DETAILED DESCRIPTION OF THE PREFERRED EMBODIMENTS

Figure 1:
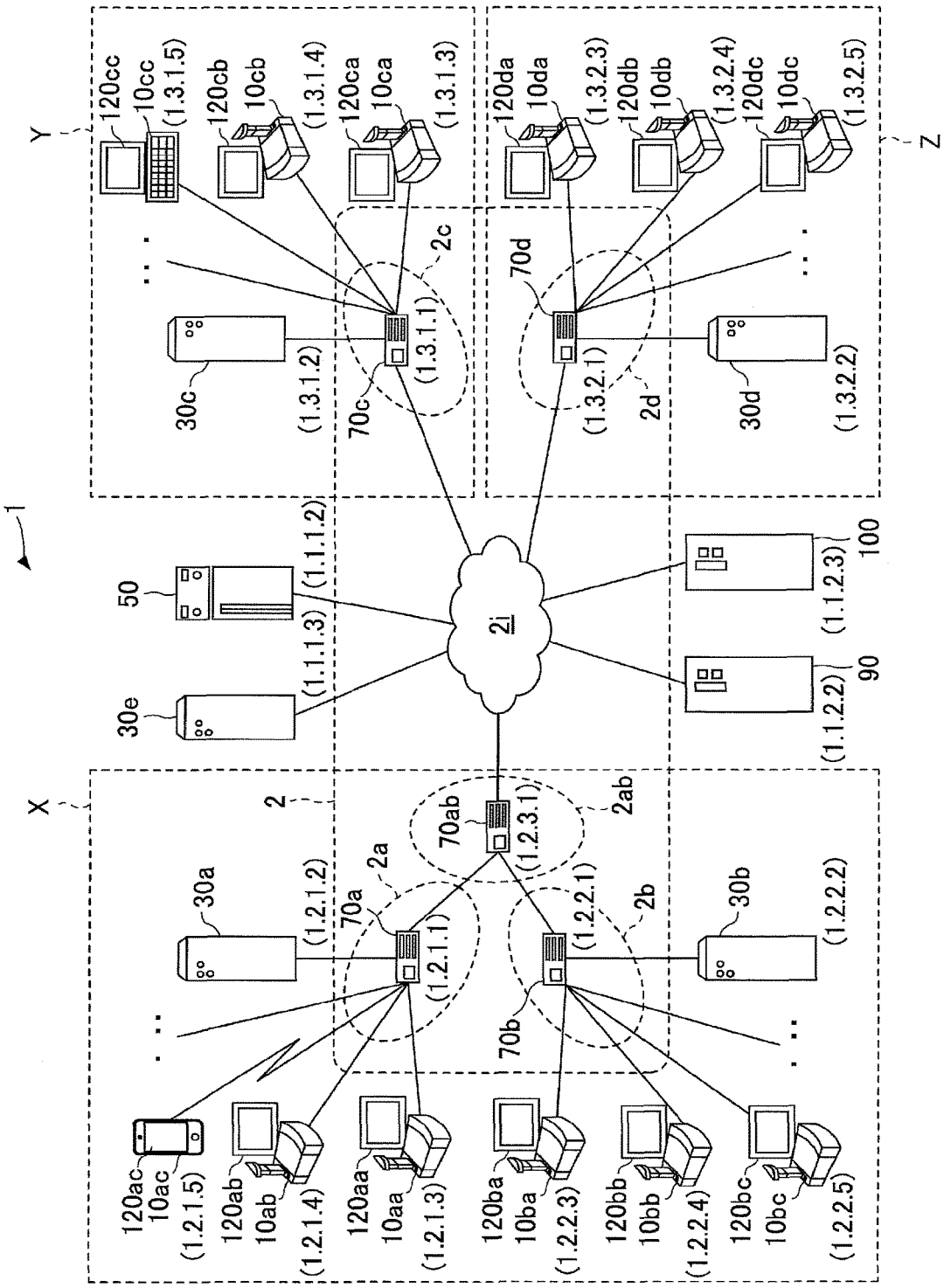
FIG. 1 is a schematic diagram of a communication system according to an embodiment.

In the following, referring to the drawings, an embodiment of the present invention will be described in detail. It should be noted that, in the following, "communication terminal" may be simply described as "terminal", and "communication management system" may be simply described as "management system".

Overall Configuration of Communication System 1

FIG. 1 is a schematic diagram of a communication system 1 according to an embodiment of the present invention. As shown in FIG. 1, the communication system 1 includes a plurality of terminals (10aa, 10ab, . . . ), displays (120aa, 120ab, . . . ) for the terminals (10aa, 10ab, . . . ), a plurality of relay apparatuses (30a, 30b, 30c, 30d, 30e), a management system 50, a program providing system 90, and a maintenance system 100. A video conference, or the like, between remote places can be realized by having communication of image data or audio data as an example of content data performed by the communication system 1. It should be noted that a plurality of routers (70a, 70b, 70c, 70d, 70ab) select an optimal route of the content data.

The terminals (10aa, 10ab, 10ac, . . . ), the relay apparatus 30a, and the router 70a are connected to each other and are capable of communicating with each other via a LAN 2a. The terminals (10ba, 10bb, 10bc, . . . ), the relay apparatus 30b, and the router 70b are connected to each other and are capable of communicating with each other via a LAN 2b.

Further, the LAN 2a and the LAN 2b are connected to each other and are capable of communicating with each other by a dedicated line 2ab including the router 70ab. Further, the LAN 2a, the LAN 2b, and the dedicated line 2ab are provided in a predetermined area X. It should be noted that the devices are not necessarily connected to each other by the dedicated line, but they may be directly connected to the Internet 2i.

The terminals (10ca, 10cb, 10cc, . . . ), the relay apparatus 30c, and the router 70c are connected to each other and are capable of communicating with each other via a LAN 2c. The LAN 2c is provided in a predetermined area Y.

The terminals (10da, 10db, 10dc, . . . ), the relay apparatus 30d, and the router 70d are connected to each other and are capable of communicating with each other via a LAN 2d. The LAN 2d is provided in a predetermined area Z. The area X, the area Y, and the area Z may be in the same country or in different countries.

The area X, the area Y, and the area Z are connected to each other and are capable of communicating with each other via the Internet 2i through respective routers (70ab, 70c, 70d). It should be noted that a call center is located in the area Z. Each terminal 10 in the area X and the area Y can receive a reception service by connecting to terminals (10da, 10db, 10dc, . . . ) in the call center.

It should be noted that, in the following, an arbitrary terminal of the terminals (10aa, 10ab, . . . ) is described a "terminal 10", an arbitrary display of the displays (120aa, 120ab, . . . ) is described as a "display 120", and an arbitrary relay apparatus of the relay apparatuses (30a, 30b, 30c, 30d, 30e) is described as a "relay apparatus 30". Further, an arbitrary router of the routers (70a, 70b, 70c, 70d, 70ab) is described as a "router 70".

Further, the management system 50, the program providing system 90, and the maintenance system 100 are connected to the Internet 2i. It should be noted that the management system 50, the program providing system 90, and the maintenance system 100 may be located in the areas (X, Y, Z), or may be located in an area other than the areas (X, Y, Z).

Further, a communication network 2 according to the present embodiment includes the LAN 2a, the LAN 2b, the dedicated line tab, the Internet 2i, LAN 2c, and the LAN 2d. In the communication network 2, there may be an area in which not only wired communication is performed, but also wireless communication such as communication via WiFi (Wireless Fidelity), Bluetooth (registered trade mark), a mobile telephone network or the like is performed.

Further, in FIG. 1, a set of four numbers shown under each terminal 10, the relay apparatus 30, the management system 50, each router 70, the program providing system 90, or the maintenance system 100 illustrates a typical IP address of IPv4 in a simplified manner. For example, an IP address of the terminal 10aa is "1. 2. 1. 3". Further, instead of IPv4, IPv6 may be used. However, for the purpose of simplicity, IPv4 is used in the description.

Further, in each terminal 10, when an application, which will be described later, is started, communication between users become available by sending and receiving content data including audio data or image data. Further, the terminal 10 sends and receives speech data by using a predetermined communication method (a call control method for connecting or disconnecting a call with a destination, and a coding method for IP packetizing the call data). It should be noted that, in the following, "application" may be abbreviated as "appl".

Further, as the call control method described above, (1) SIP (Session Initiation Protocol), (2) H.323, (3) enhanced SIP protocol, (4) protocol for instant messenger, (5) protocol utilizing a MESSAGE method of SIP, (6) protocol of Internet Relay Chat (IRC), (7) protocol enhanced from a protocol for instant messenger, or the like, can be listed. The above (4) protocol for instant messenger is a protocol used for, for example, (4-1) Extensible Messaging and Presence Protocol (XMPP), (4-2) ICQ (registered trademark), AIM (registered trademark), or Skype (registered trademark). Further, the above (7) protocol enhanced from a protocol for instant messenger is, for example, Jingle.

Hardware Configuration of the Embodiment

Figure 2:
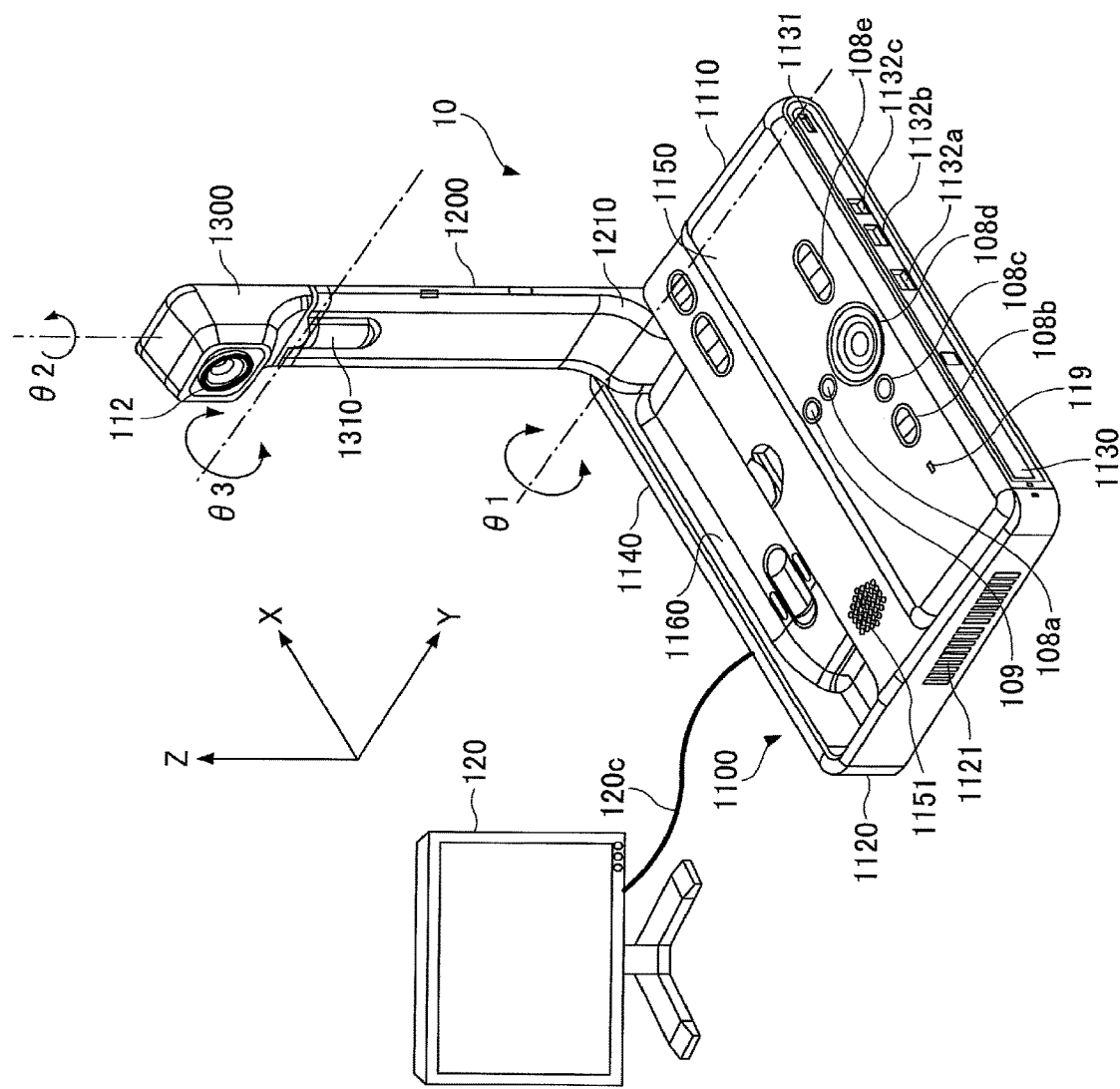
FIG. 2 is an external view of a terminal according to an embodiment.

Next, a hardware configuration of the present embodiment will be described. FIG. 2 is an external view of a terminal 10 according to an embodiment. As shown in FIG. 2, the terminal 10 includes a housing 1100, an arm 1200, and a camera housing 1300. In a front wall 1120 of the housing 1100, there is an air intake surface 1121 formed with a plurality of air intake holes, and, in a rear wall 1110 of the housing 1100, there is an air exhaust surface formed with a plurality of air exhaust holes. With the above arrangement, by driving a cooling fan embedded in the housing 1100, it becomes possible to take in air in front of the terminal 10 through the air intake surface 1121, and to exhaust the air to the rear of the terminal 10 through the air exhaust surface. In a right side wall 1130 of the housing 1100, a sound pickup hole 1131 is formed, and, by using a built-in mike 114 which will be described later, sound such as voice, sound of things, noise, etc., can be picked up.

In the right wall 1130 side of the housing 1100, an operation panel 1150 is formed. In the operation panel 1150, there are a plurality of operation buttons (108a through 108e), a power supply switch 109, and an alarm lamp 119, which will be described later. Also, a sound output surface 1151 is formed in the operation panel 1150, which is formed by a plurality of sound output holes used for passing output sound from a built-in speaker 115 which will be described later. Further, in the left wall 1140 side of the housing 1100, a housing unit 1160 is formed as a concave portion for housing the arm 1200 and the camera housing 1300. In the right wall 1130 of the housing 1100, a plurality of connection ports (1132a through 1132c) are formed for electrically connecting cables for an external device connection interface 118 which will be described later. On the other hand, in the left wall 1140 of the housing 1100, a connection port is formed for electrically connecting a cable 120c of a display 120 for a display interface (I/F) 117.

It should be noted that, in the following, an arbitrary operation button of the operation buttons (108a through 108e) will be described as an "operation button 108", and an arbitrary connection port of the connection ports (1132a through 1132c) will be described as a "connection port 1132".

Next, the arm 1200 is attached to the housing 1100 via a torque hinge 1210, and is capable of rotating in an up-and-down direction within a range of tilt angle $\theta 1$ of 135 degrees with respect to the housing 1100. FIG. 2 illustrates a state in which the tilt angle is 90 degrees.

In the camera housing 1300, there is a built-in camera 112 which will be described later and is capable of taking images of a user, a document, a room, etc. Further, in the camera housing 1300, a torque hinge 1310 is formed. Further, the camera housing 1300 is attached to the arm 1200 via the torque hinge 1310, and is capable of rotating in a right-andleft direction within a range of +/−180 degrees of pan angle θ2, and rotating in an up-and-down direction within a range of +/−45 degrees of tilt angle θ3, with respect to the arm 1200, assuming that FIG. 2 illustrates a state in which θ2 and θ3 are zero degrees.

It should be noted that an external view of the terminal 10 is not limited to the view shown in FIG. 2, which is just an example. As another example, the terminal 10 may be a general-purpose computer, a mobile phone terminal, a projector, an electronic white board, digital signage, or the like (refer to terminals (10ac, 10cc) in FIG. 1). When a computer used for the terminal 10 does not include a mike and a camera, an external mike and an external camera can be connected to the computer. Further, in the case where the terminal 10 is a mobile telephone terminal, or the like, the terminal 10 may be connected to the Internet 2i through wireless communication utilizing a wireless LAN, a mobile telephone network, etc. As described above, a general-purpose computer or a mobile telephone terminal can be used as a terminal 10 according to the present embodiment. Further, in the case where a general-purpose computer is used as a terminal 10, an application may be installed beforehand which causes the computer to perform processes of the terminal 10 which will be described later.

It should be noted that external views of the management system 50, the program providing system 90, and the maintenance system 100 are the same as an external view of a typical server computer, and thus, descriptions of the external views will be omitted.

Figure 3:
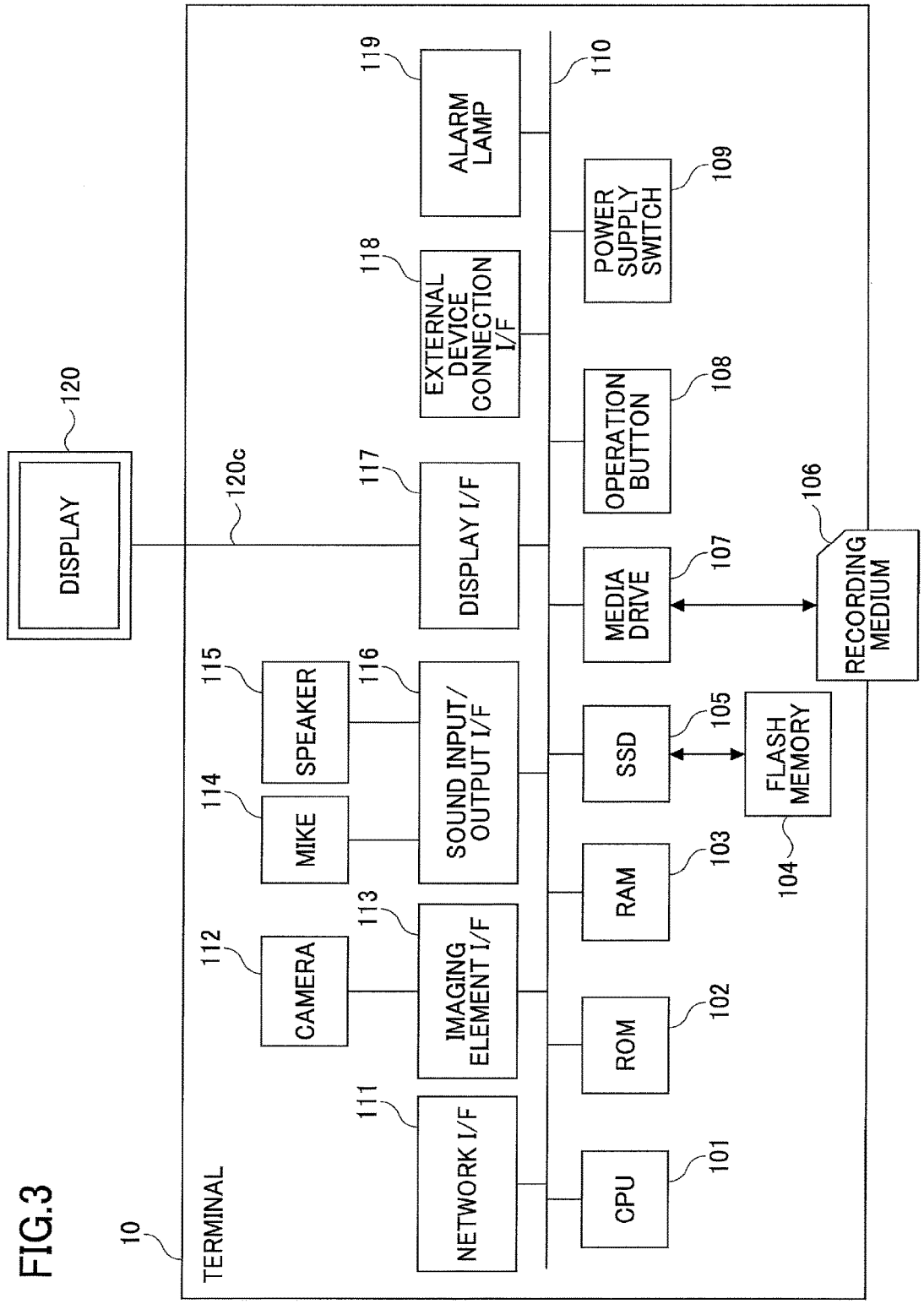
FIG. 3 is a hardware configuration diagram of a terminal according to an embodiment.

FIG. 3 is a hardware configuration of a terminal 10 according to an embodiment. The terminal 10 includes a central processing unit (CPU) 101 for controlling overall operations of the terminal 10, a read only memory (ROM) 102 in which programs used for driving the CPU 101 such as an initial program loader are stored, a random access memory (RAM) 103 which is used for a work area of the CPU 101, a flash memory 104 in which programs for the terminal 10, and various kinds of data including image data, audio data, etc., are stored, a solid state drive (SSD) 105 which controls writing and reading the various data to and from the flash memory 104 according to the control of the CPU 101, a media interface 107 which controls writing and reading data to and from a recording medium 106 including a flash memory, an integrated circuit (IC) card, etc., the operation buttons 108 operated for, for example, selecting a destination of the terminal 10, the power supply switch 109 for switching ON/OFF the power supply of the terminal 10, and a network interface (I/F) 111 for performing data transmission by utilizing the communication network 2.

Further, the terminal 10 includes the built-in camera 112 which captures image data by taking an image of a subject according to the control of the CPU 101, an imaging element interface 113 which controls driving of the camera 112, the built-in mike 114 for inputting sound, a built-in speaker 115 for outputting sound, a sound input/output interface 116 for processing input/output of an audio signal between the mike 114 and the speaker 115 according to the control of the CPU 101, the display interface (I/F) 117 for transmitting image data to the external display 120 according to the control of the CPU 101, the external device connection interface (I/F) 118 for connecting various external devices, the alarm lamp 119 for indicating an error of various functions of the terminal 10, and a bus line 110 such as an address bus, a data bus, etc., for electrically connecting the above elements as shown in FIG. 3.

The display 120 is a display unit which includes a liquid crystal or an organic electroluminescence (EL) panel used for displaying a subject image, or the like. Further, the display 120 is connected to the display I/F 117 via the cable 120c. The cable 120c may be a cable for an analog RGB (VGA) signal, a cable for a component video, or a cable for a signal of High-Definition Multimedia Interface (HDMI) (registered trademark) or Digital Video Interactive (DVI).

The camera 112 includes a lens and a solid-state image sensing device which is used for converting light into electricity and computerizing the subject image, and as the solid-state image sensing device, Complementary Metal Oxide Semiconductor (CMOS), Charge Coupled Device (CCD), etc., are used.

To the external device connection I/F 118, via a Universal Serial Bus (USB) cable, or the like, which is inserted into the connection port 1132 of the housing 1100, external devices such as an external camera, an external mike, and an external speaker can be electrically connected. In the case where the external camera is connected, according to the control of the CPU 101, priority is given to the external camera to be driven over the built-in camera 112. Similarly, in the case where an external mike is connected or an external speaker is connected, according to the control of the CPU 101, priority is given to the external mike or the external speaker over the built-in mike 114 or the built-in speaker 115, respectively.

It should be noted that the recording medium 106 is detachable from the terminal 10. Further, it is not limited to the flash memory 104 that is used, and, Electrically Erasable and Programmable ROM (EEPROM), or the like may be used as long as it is a non-volatile memory to/from which data are written/read according to the control of the CPU 101.

Figure 4:
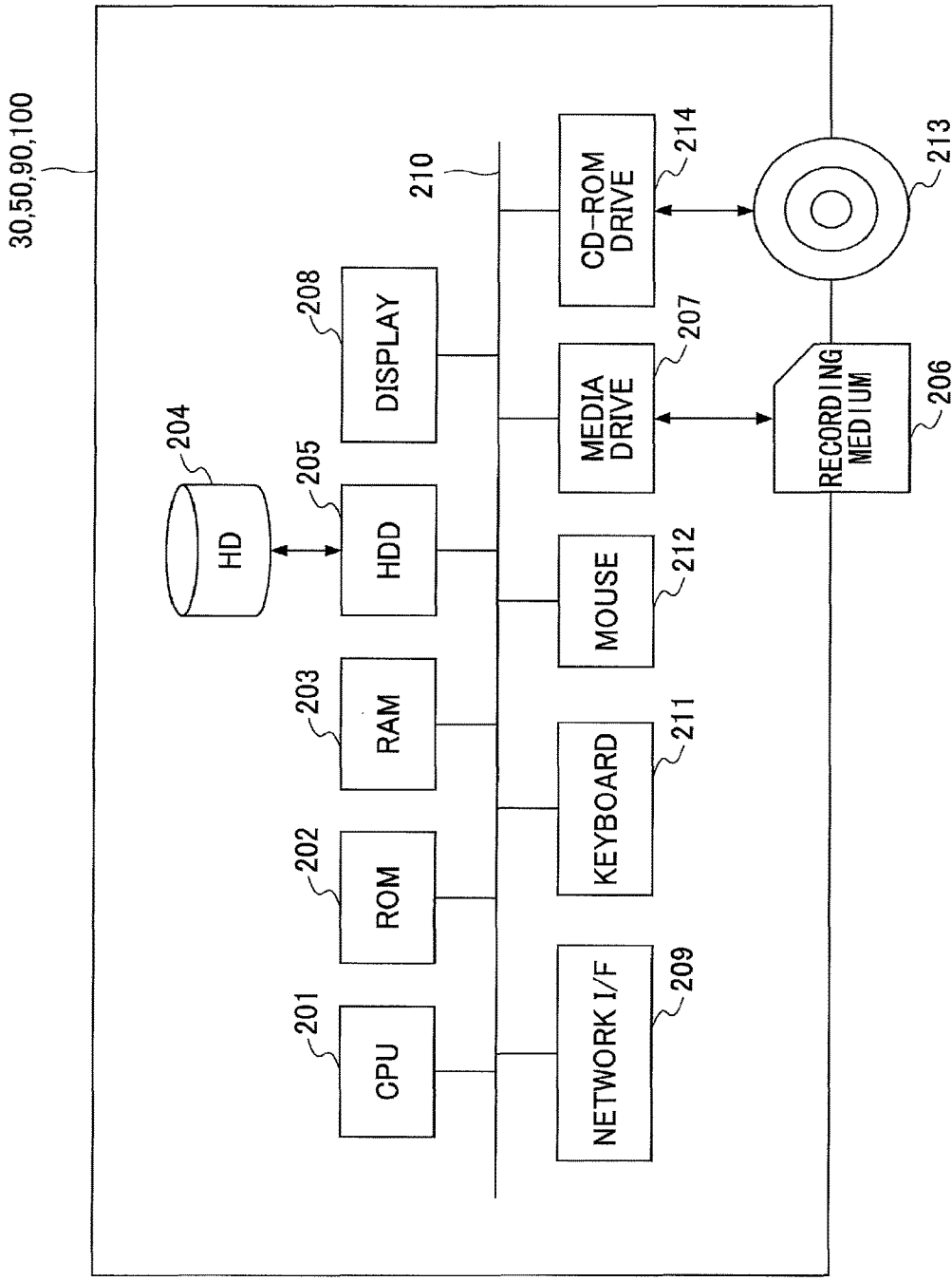
FIG. 4 is a hardware configuration diagram of a management system, a relay apparatus, a program providing system, or a maintenance system according to an embodiment.

FIG. 4 is a hardware configuration diagram of a management system 50 according to an embodiment. The management system 50 includes a CPU 201 for controlling overall operations of the management system 50, a ROM 202 in which programs used for driving the CPU 201 such as an IPL are stored, a RAM 203 which is used for a work area of the CPU 201, a HD 204 for storing various data including programs for the management system 50, etc., a hard disk drive (HDD) 205 for controlling various data reading and data writing of the HD 204 according to the control of the CPU 201, a medium drive 207 for controlling data reading and data writing (storage) of a recording medium 206 including a flash memory, a display 208 for displaying various information items including a cursor, a menu, a window, a character, or an image, a network interface (I/F) 209 for performing data communications by using the communication network 2, a keyboard 211 including a plurality of keys for inputting a character, a numerical value, various instructions, etc., a mouse 212 for selecting and executing various instructions, selecting a process target, moving the cursor, or the like, a compact disc read only memory (CD-ROM) drive 214 for controlling various data reading of a CD-ROM 213 as an example of a detachable recording medium, and a bus line 210 such as an address bus, a data bus, etc., for electrically connecting the above elements as shown in FIG. 4.

On the other hand, the relay apparatus 30, the program providing system 90, and the maintenance system 100 have similar hardware configurations as the above management system 50, and thus, the descriptions will be omitted.

Figure 5:
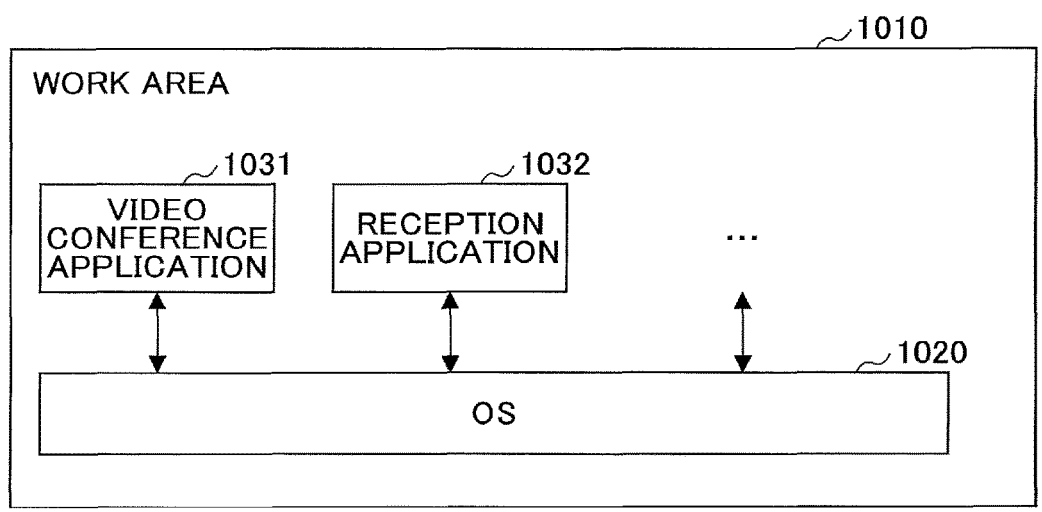
FIG. 5 is a software configuration diagram of a terminal according to an embodiment.

FIG. 5 is a software configuration of a terminal 10 according to an embodiment. As shown in FIG. 5, an OS 1020, the video conference application 1031, and the reception application 1032 are held in a work area 1010 of the RAM 103. The OS 1020 and the applications (1031, 1032) are installed in the terminal 10.

Further, the OS 1020 provides basic functions, and is basic software which controls the entire terminal 10. The video conference application 1031 is an application for connecting with another terminal 10 and performing the video conference. The reception application 1032 is an application for connecting with a terminal 10 of a call center, and communicating with an operator.

It should be noted that the above applications (1031, 1032) are just examples, and other applications may be installed. In the case where the other applications are installed, the other applications may be stored in the program providing system 90, and the other applications may be downloaded according to a request from the terminal 10. Further, in the case where two or more video conference applications are installed, video conference applications with different protocols such as the above (1) through (7) may be installed.

Functional Configuration of Embodiment

Next, a functional configuration of the communication system of the present embodiment will be described.

Figure 6:
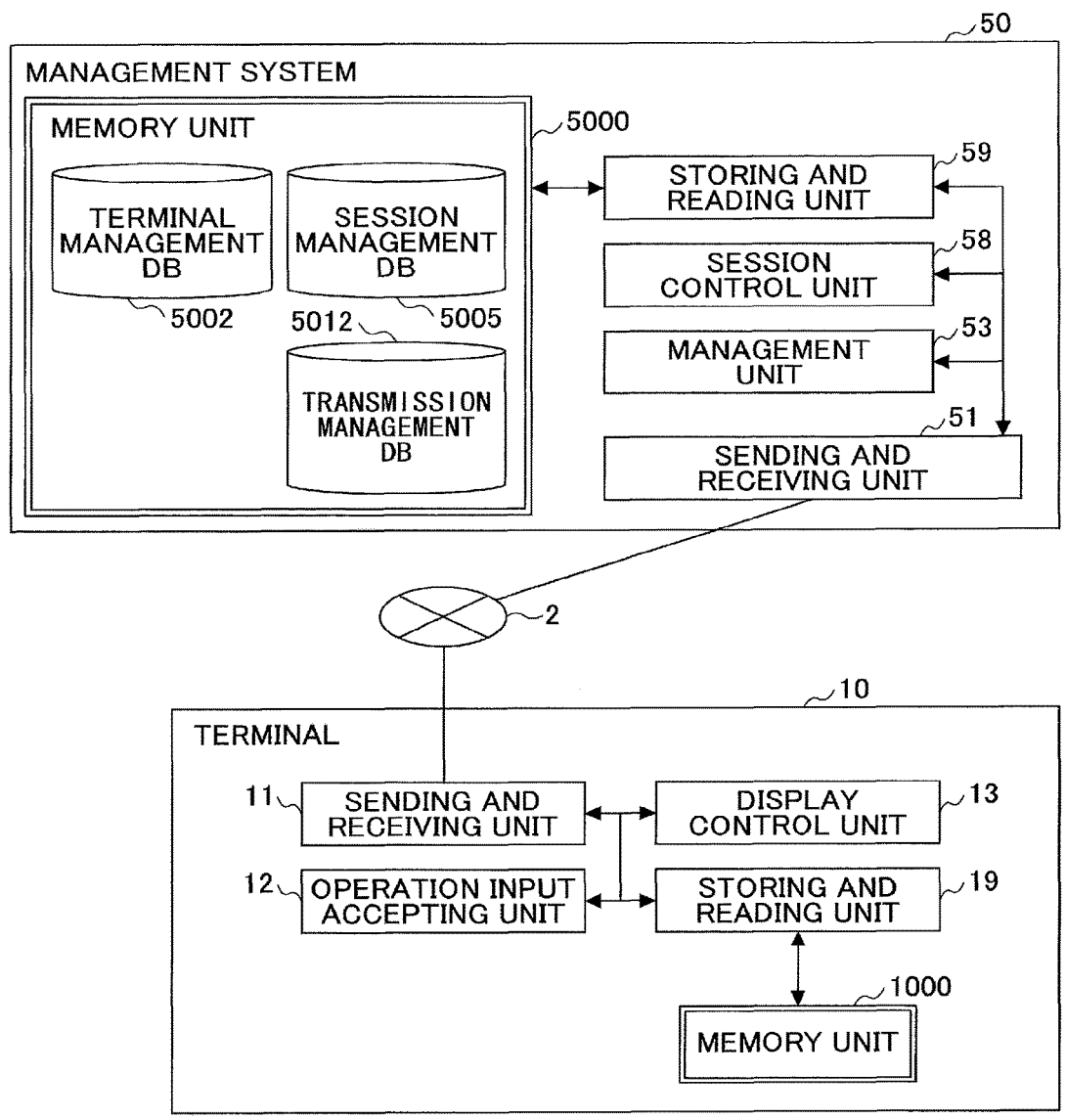
FIG. 6 is a functional block diagram of a terminal and a management system included in a communication system according to an embodiment.

FIG. 6 is a functional block diagram of a terminal 10 and a management system 50 included as a part of a communication system 1 according to an embodiment. It should be noted that, in FIG. 6, the terminal 10 and the management 50 are connected to perform data communications via a communication network 2.

Functional Configuration of Communication Terminal

The terminal 10 includes a sending and receiving unit 11, an operation input receiving unit 12, a display control unit 13, and a storing and reading unit 19. The above units are functions which are realized by any one of the elements shown in FIG. 3 which operates according to instructions from the CPU 101 which executes a program read from the flash memory 104 and written to the RAM 103.

Further, the terminal 10 includes a memory unit 1000 including a ROM 102, a RAM 103, and a flash memory 104 as shown in FIG. 3.

Next, the functional configuration of the terminal 10 will be described in detail. It should be noted that when the functional configuration of the terminal 10 is described, relations between functions and main elements of the elements shown in FIG. 3, which are used for realizing the functions, will also be described.

The sending and receiving unit 11 is realized by instructions from the CPU 101 and the network I/F 111, and performs sending and receiving various data (or information) to and from a terminal, an apparatus, a system, etc., with which the sending and receiving unit 11 communicates.

The operation input accepting unit 12 is realized by instructions from the CPU 101, the operation buttons (108a, 108b, 108c, 108d, 108e) and the power supply switch 109, and accepts various inputs or various selections made by a user.

The display control unit 13 is realized by instructions from the CPU 101 and the display I/F 117, and controls outputting an image from the display 120 based on image data sent from the communication destination terminal 10.

The storing and reading unit 19 is realized by instructions from the CPU 101 and the SSD 105 or by instructions from the CPU 101, and performs a process of storing various data in the memory unit 1000 and reading the various data stored in the memory unit 1000.

Functional Configuration of Management System

The management system 50 includes a sending and receiving unit 51, a management unit 53, a session control unit 58, and a storing and reading unit 59. The above units are functions or means which are realized by any one of elements shown in FIG. 4 which operates according to instructions from the CPU 201 which executes a program for the management system 50 read from the HD 204 and written to the RAM 203. Further, the management system 50 includes a memory unit 5000 including the HD 204. In the memory unit 5000, the databases (DB) including corresponding tables as shown below are included.

(Terminal Management Table)

FIG. 7A is a conceptual diagram illustrating a terminal management table. In the memory unit 5000, a terminal management database (DB) 5002 including the terminal management table as shown in FIG. 7A is included. In the terminal management table, for each communication ID of a terminal 10, a destination name (terminal name) when the terminal 10 is a destination, state information indicating a state of the terminal 10 are associated with the communication ID and stored. It should be noted that the communication ID is information for identifying the terminal 10 as a communication destination in the communication system 1. As the communication ID, it is not limited, but identification information of the terminal 10, an account information of a user of the terminal 10, or the like are included. In the following, the descriptions will be continued assuming that communication IDs of the terminals (10aa, 10ab, 10ac, 10db) are "01aa, 01ab, 01bc, 01db", respectively.

(Session Management Table)

FIG. 7B is a conceptual diagram illustrating a session management table. In the memory unit 5000, a session management database (DB) 5005 including a session management table as shown in FIG. 7B is included. In the session management table, for each session ID of a session "sed" for transmitting content data between the terminals 10, a relay apparatus ID of a relay apparatus 30 which relays the content data in the session "sed", and communication IDs of the terminals 10 participating in the session "sed" are associated with the session ID and stored.

(Transmission Management Table)

FIG. 7C is a conceptual diagram illustrating a transmission management table. In the memory unit 5000, a transmission management database (DB) 5012 including the transmission management table as shown in FIG. 7C is included. In the transmission management table, state information indicating a state of a first terminal 10 as one of the terminals 10, and state information indicating a state of a second terminal 10 as the other of the terminals 10 are associated with transmission availability information indicating whether transmission of content data from the first terminal 10 to the second terminal 10 is permitted, and whether transmission of content data from the second terminal 10 to the first terminal 10 is permitted, and quality information indicating quality of the content data to be transmitted and stored.

Functional Configuration of Management System

Next, a functional configuration of the management system 50 will be described in detail. It should be noted that when the functional configuration of the management system 50 is described, relations between functions and main elements of the elements shown in FIG. 4, which are used for realizing the functions of the management system 50, will be also described.

The sending and receiving unit 51 is realized by instructions from the CPU 201 and the network I/F 209, and performs sending and receiving various data (or information) to and from a terminal, an apparatus, or a system via the communication network 2.

The management unit 53 is realized by instructions from the CPU 201 and performs a process of updating various information items in the terminal management table (refer to FIG. 7A) in order to maintain the latest state of the terminal 10.

The session control unit 58 is realized by instructions from the CPU 201, and controls the session "sed" for sending and receiving content data between the terminals 10. The control of the session includes establishing the session "sed", causing the terminals 10 to participate in the established session "sed", disconnecting the session, controlling transmission availability of content data in the established session "sed", and the like.

The storing and reading unit 59 is realized by instructions from the CPU 201 and the HDD 205 or by instructions from the CPU 201, and performs a process of storing various data in the memory unit 5000 and reading the various data stored in the memory unit 5000.

Processes and Operations of Communication System 1

The configuration and functions (or means) of the communication system 1 have been described above. Next, a method of processing in the communication system 1 will be described.

First, referring to FIG. 8, a process of calling a destination terminal 10 in order to start video conferencing between the terminals 10 will be described. FIG. 8 is a sequence diagram illustrating a process of calling the destination terminal. In the following, a process will be described in which the terminal 10aa calls the terminal 10db. In each of the terminals 10, the reception application 1032 is started. A process will be described which is performed by various function units and is realized by the reception application 1032 and a hardware configuration of the terminal 10.

When the reception application 1032 is started in the guest side terminal 10aa, the sending and receiving unit 11 sends start request information indicating a start request of communication with the operator side terminal 10db to the management system 50. In the start request information, communication IDs of the terminal 10aa as a start requesting source and the terminal 10db as a destination are included (step S21).

In the management system 50 which has received the start request information, the session control unit 58 selects a relay apparatus 30 which relays content data between the terminals (10aa, 10db) (step S22). As a method for selecting the relay apparatus 30, a known method is used, including a selection method based on loads of the relay apparatuses 30, a selection method based on the location information of the terminals (10aa, 10db), or the like. In the following, the description will be continued in the case where the relay apparatus 30e is selected in step S22.

The sending and receiving unit 51 of the management system 50 transmits a relay request for relaying content data to the selected relay apparatus 30e (step S23).

In the case where the requested relaying is available, the relay apparatus 30e transmits relay permission information indicating permission for the relay request to the management system 50 (step S24). In the relay permission information, relay apparatus connecting information for connecting to the relay apparatus 30e is included. In the relay apparatus connecting information, an IP address of the relay apparatus 30e, authentication information, a port number, a session ID of a session "sed" for sending content data between the terminals (10aa, 10db), etc., may be included.

The sending and receiving unit 51 of the management system 50, upon receiving the relay permission information, transmits the relay apparatus connecting information included in the relay permission information to the start requesting source terminal 10aa (step S25).

Further, the storing and reading unit 59 of the management system 50 associates a session ID of the session "sed" with a relay apparatus ID of the relay apparatus 30e selected in step S22, communication IDs of the terminals (10aa, 10db) participating in the session "sed", and stores them in the session management table (refer to FIG. 7B) (step S26).

Figure 9:
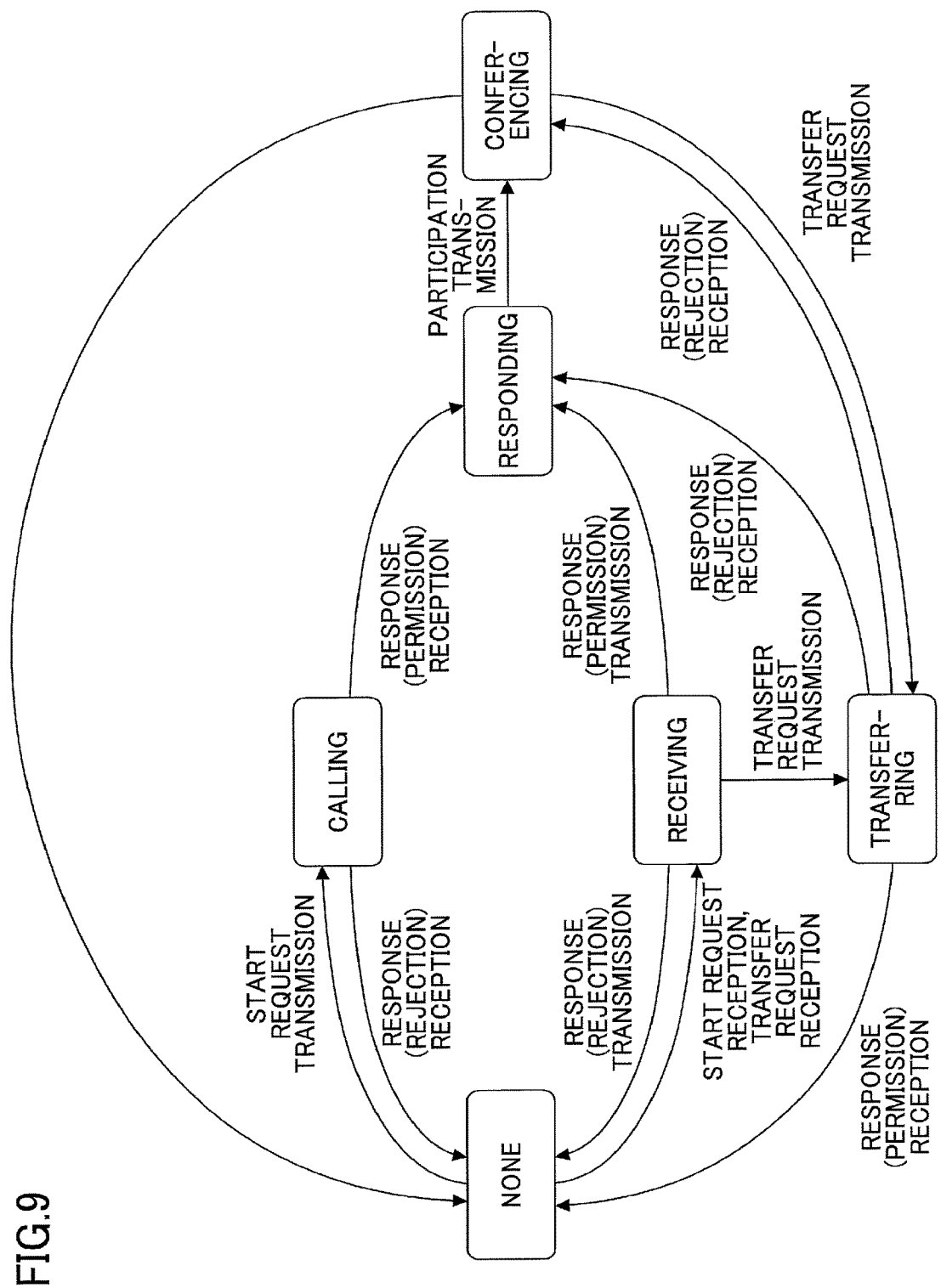
FIG. 9 is a state transition diagram illustrating a state transition of a terminal.

FIG. 9 is a state transition diagram illustrating a state transition of a terminal 10. In FIG. 9, state information indicating a state of the terminal 10 is shown in a frame. In a call control protocol of the reception application 1032, it is defined that the state of the terminal 10 transitions as shown in the state transition diagram of FIG. 9. It should be noted that state information "NONE" indicates a state in which the terminal 10 does not perform a call control related process. State information "CALLING" indicates a state in which the terminal 10 is performing a process of calling a destination terminal 10 by requesting a communication start. State information "RECEIVING" indicates a state in which the terminal 10 is performing a receiving process upon receiving the communication start request. State information "TRANSFERRING" indicates a state in which the terminal 10 is performing a transferring process of a received call. State information "RESPONDING" indicates a state in which the terminal 10 is responding or the terminal 10 is being responded. State information "CONFERENCING" indicates a state in which the terminal 10 is sending and receiving content data to and from another terminal 10, and the conference is held between users.

Upon receiving the start request information transmitted by the terminal 10aa, the management unit 53 of the management system 50 controls the state of the terminal 10aa according to a state transition rule indicated by the state transition diagram of FIG. 9 (step S27). In other words, the management unit 53 updates the state information associated with the communication ID of the start requesting source terminal 10aa from "NONE" to "CALLING" in the terminal management table via the storing and reading unit 59. The updated terminal management table is shown in Table 1.

TABLE 1

| COMMUNICATION ID | DESTINATION NAME (TERMINAL NAME) | STATE INFORMATION |
|---|---|---|
| 01aa | TERMINAL AA | CALLING |
| 01da | TERMINAL DA | NONE |
| 01db | TERMINAL DB | NONE |
| . . . | . . . | . . . |

The terminal 10aa is connected to the relay apparatus 30e by transmitting from the sending and receiving unit 11 of the terminal 10aa to the relay apparatus 30e the relay apparatus connecting information received from the management system 50 (step S28). When the terminal 10aa is connected to the relay apparatus 30e, image data and/or audio data (content data) are transmitted to the relay apparatus 30e based on an image taken by the camera 112 of the terminal 10aa and/or sound collected by the mike 114, and the terminal 10aa requests for image data and/or audio data transmitted by the communication destination terminal 10db (step S29). It should be noted that the image data include relatively high quality (high resolution) image data and relatively low quality (low resolution) image data. Further, the image data and/or the audio data are streaming data, and are continuously transmitted until the terminal 10aa is disconnected from the session.

The sending and receiving unit 51 of the management system 50 sends to the destination terminal 10db communication start requesting information received from the terminal 10aa and the relay apparatus connecting information for connecting to the relay apparatus 30e (step S30).

Upon transmitting the start request information to the terminal 10db, the management unit 53 of the management system 50 controls the state of the terminal 10db according to the state transition rule indicated by the state transition diagram of FIG. 9 (step S31). In other words, the management unit 53 updates the state information associated with the communication ID of the destination terminal 10db from "NONE" to "RECEIVING" in the terminal management table via the storing and reading unit 59. The updated terminal management table is shown in Table 2.

TABLE 2

| COMMUNICATION ID | DESTINATION NAME (TERMINAL NAME) | STATE INFORMATION |
|---|---|---|
| 01aa | TERMINAL AA | CALLING |
| 01da | TERMINAL DA | NONE |
| 01db | TERMINAL DB | RECEIVING |
| ... | ... | ... |

The terminal 10db is connected to the relay apparatus 30e by transmitting from the sending and receiving unit 11 of the terminal 10db to the relay apparatus 30e the relay apparatus connecting information received from the management system 50 (step S32). When the terminal 10db is connected to the relay apparatus 30e, image data and/or audio data are transmitted to the relay apparatus 30e based on an image taken by the camera 112 of the terminal 10db and/or sound collected by the mike 114, and the terminal 10db requests for image data and/or audio data transmitted by the communication destination terminal 10aa (step S33). It should be noted that the image data include relatively high quality (high resolution) image data and relatively low quality (low resolution) image data. Further, the image data and/or the audio data are streaming data, and are continuously transmitted until the terminal 10db is disconnected from the session.

When the state of the terminal 10db is updated, the session control unit 58 controls transmission of content data between the terminals (10aa, 10db) according to the updated state. First, the session control unit 58 identifies communication IDs "01aa" and "01db" of the terminals (10aa, 10db) participating in the session "sed" by referring to the session management table (FIG. 7B). Next, the session control unit 58 searches the terminal management table (refer to Table 2) by using the communication IDs "01aa" and "01db" as search keys and reads the corresponding state information "CALLING" and "RECEIVING". Next, the session control unit 58 searches the transmission management table (refer to FIG. 7C) by using a set of the read state information "CALLING" and "RECEIVING" as a search key and reads corresponding transmission availability information "TRANSMISSION FROM THE FIRST TERMINAL TO THE SECOND TERMINAL IS ONLY AVAILABLE" and quality information "LOW". Based on the read transmission availability information and the quality information, the session control unit 58 determines to permit transmission of image data and audio data with low quality from the first terminal (calling terminal 10aa) to the second terminal (receiving terminal 10db), and not to permit transmission of content data from the second terminal to the first terminal.

The sending and receiving unit 51 of the management system 50 transmits control information indicating the determination by the session control unit 58 to the relay apparatus 30e (step S35).

Upon receiving the control information, the relay apparatus 30e stores relaying information based on the control information in a volatile memory area of the relay apparatus 30e. The relaying information stored in the volatile memory area of the relay apparatus 30e is shown in Table 3. Table 3 shows that image data and audio data with low quality are transmitted from the terminal 10aa whose IP address is "1.1.1.3" to the terminal 10db whose IP address is "1.3.2.4" and that the content data are not transmitted in the opposite direction. It should be noted that in Table 3, the IP address of the terminal 10 is stored as information indicating the terminal 10, but other information such as a communication ID may be stored as long as it can be used for identifying the terminal 10.

TABLE 3

| RELAY SOURCE TERMINAL IP ADDRESS | RELAY DESTINATION IP ADDRESS | RELAYED CONTENT DATA |
|---|---|---|
| 1.2.1.3 | 1.3.2.4 | IMAGE DATA (LOW), AUDIO DATA |
| 1.3.2.4 | 1.2.1.3 | NONE |

The relay apparatus 30e relays content data between the terminals (10aa, 10db) according to the relaying information stored in the volatile memory area. In other words, the relay apparatus 30e transmits to the terminal 10db the image data and the audio data with low quality of the content data received from the terminal 10aa (step S36). On the other hand, the relay apparatus 30e does not transmit to the terminal 10aa content data received from the terminal 10db.

With the above process, while content data are not transmitted from the operator side terminal 10db in a "RECEIVING" state to the guest side terminal 10aa in a "CALLING" state, content data are transmitted from the guest side terminal 10aa to the operator side terminal 10db. After receiving a call, the operator as a user of the terminal 10db can prepare to determine, for example, whether the caller is one of the operator's clients based on the content data (image, sound) received from the terminal 10aa before responding to the call.

Figure 10:
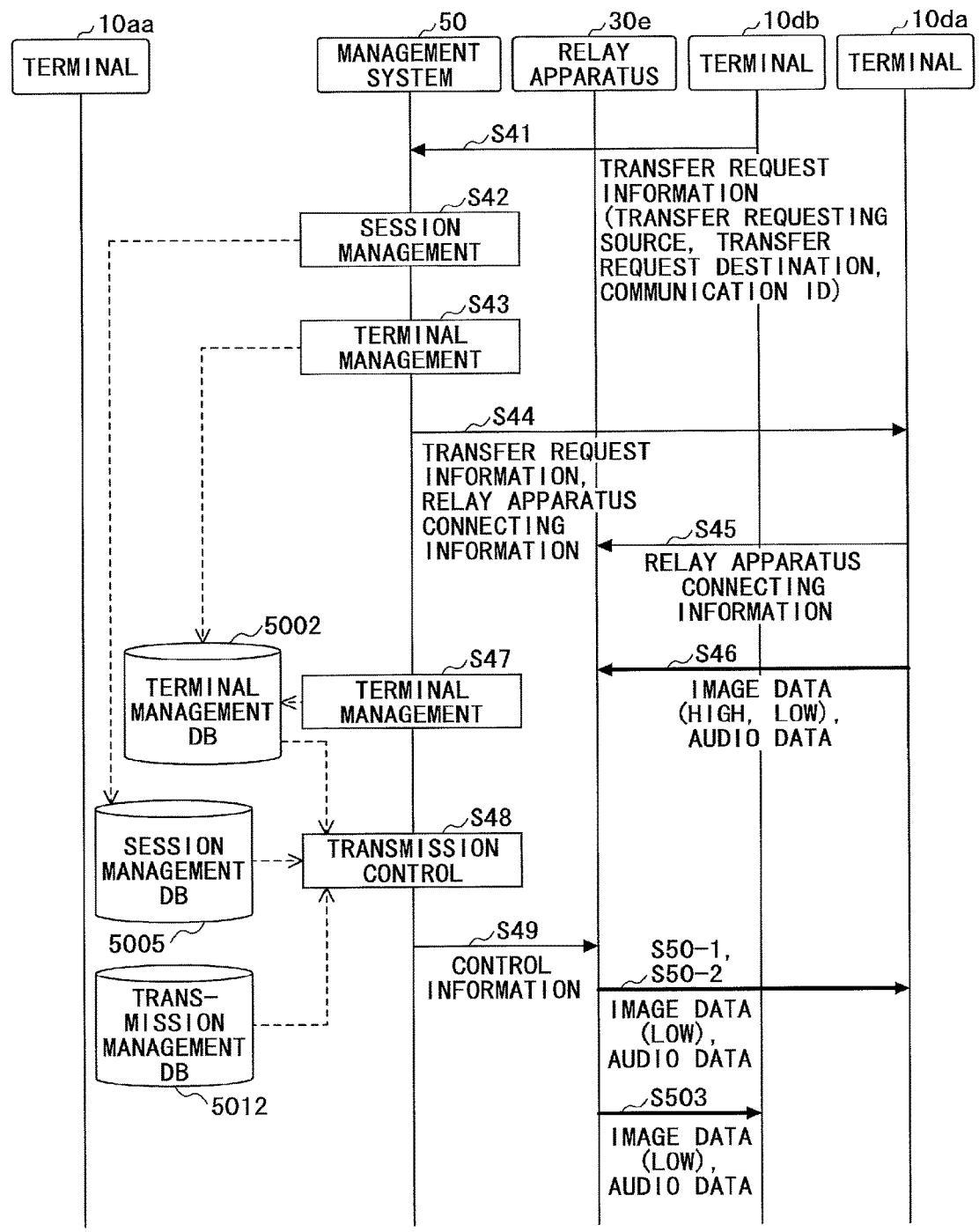
FIG. 10 is a sequence diagram illustrating a process of transferring a received call.

Next, referring to FIG. 10, a process will be described in which the terminal 10db transfers a call received from the terminal 10aa to the terminal 10da of another operator. FIG. 10 is a sequence diagram illustrating a process of transferring a received call.

When the operation input accepting unit 12 of the terminal 10db accepts an input of transfer request, the sending and receiving unit 11 transmits to the management system 50 transfer requesting information indicating a request for transferring a call received from the terminal 10aa to the terminal 10da (step S41). In the transfer request information, communication IDs of terminals of a transfer requesting source and a transfer request destination (10db, 10da) are included.

Upon receiving the transfer request information, the storing and reading unit 59 of the management system 50 associates a communication ID of the terminal 10da as the transfer request destination that newly participates in the session "sed" with a session ID of the session "sed", and adds the communication ID to the session management table (refer to FIG. 7B) (step S42).

Further, the management unit 53 of the management system 50 controls the state of the terminal 10db according to the state transition rule indicated by the state transition diagram of FIG. 9 (step S43). In other words, the management unit 53 updates the state information associated with the communication ID of the transfer requesting source terminal 10db from "RECEIVING" to "TRANSFERRING" in the terminal management table via the storing and reading unit 59. The updated terminal management table is shown in Table 4.

TABLE 4

| COMMUNICATION ID | DESTINATION NAME (TERMINAL NAME) | STATE INFORMATION |
|---|---|---|
| 01aa | TERMINAL AA | CALLING |
| 01da | TERMINAL DA | NONE |
| 01db | TERMINAL DB | TRANSFERRING |
| ... | ... | ... |

It should be noted that even when a set of states of terminals (10aa, 10db) is updated from "CALLING" and "RECEIVING" to "CALLING" and "TRANSFERRING", there is no change in the type of content data transmitted between the terminals (10aa, 10db) (refer to FIG. 7C), and thus, it is not necessary for the management system 50 to transmit new control information to the relay apparatus 30.

The sending and receiving unit 51 of the management system 50 sends to the transfer request destination terminal 10da the transfer request information received from the transfer requesting source terminal 10db, and relay apparatus connecting information for connecting to the relay apparatus 30e (step S44).

The sending and receiving unit 11 of the terminal 10da is connected to the relay apparatus 30e by transmitting to the relay apparatus 30e the relay apparatus connecting information received from the management system 50 (step S45). When the terminal 10da is connected to the relay apparatus 30e, image data and/or audio data are transmitted to the relay apparatus 30e based on an image taken by the camera 112 of the terminal 10da and/or sound collected by the mike 114, and the terminal 10da requests for image data and/or audio data transmitted by the communication destination terminals (10aa, 10db) (step S46). It should be noted that the image data include relatively high quality (high resolution) image data and relatively low quality (low resolution) image data. Further, the image data and/or the audio data are streaming data, and are continuously transmitted until the terminal 10da is disconnected from the session.

Upon transmitting the start request information to the terminal 10da, the management unit 53 of the management system 50 controls the state of the terminal 10da according to the state transition rule indicated by the state transition diagram of FIG. 9 (step S47). In other words, the management unit 53 updates the state information associated with the communication ID of the transfer request destination terminal 10da from "NONE" to "RECEIVING" in the terminal management table via the storing and reading unit 59. The updated terminal management table is shown in Table 5.

TABLE 5

| COMMUNICATION ID | DESTINATION NAME (TERMINAL NAME) | STATE INFORMATION |
|---|---|---|
| 01aa | TERMINAL AA | CALLING |
| 01da | TERMINAL DA | RECEIVING |
| 01db | TERMINAL DB | TRANSFERRING |
| ... | ... | ... |

When the state of the terminal 10da is updated, the session control unit 58 controls transmission of content data between the terminal (10aa or 10db) and the terminal 10da according to the updated state (step S48). In this case, the session control unit 58 identifies communication IDs "01aa", "01da", and "01db" of the terminals (10aa, 10da, 10db) participating in the session "sed" by referring to the session management table. Next, the session control unit 58 searches the terminal management table (refer to Table 5) by using the communication IDs "01aa", "01da", and "01db" as search keys and reads the corresponding state information items "CALLING", "RECEIVING", and "TRANSFERRING". Next, the session control unit 58 searches the transmission management table (refer to FIG. 7C) by using a set of the state information items "CALLING" and "RECEIVING" of the terminals (10aa, 10da) of the read state information as a search key and reads corresponding transmission availability information "TRANSMISSION FROM THE FIRST TERMINAL TO THE SECOND TERMINAL IS ONLY AVAILABLE" and quality information "LOW". Based on the read transmission availability information and the quality information, the session control unit 58 determines to permit transmission of image data and audio data with low quality from the first terminal (calling terminal 10aa) to the second terminal (receiving terminal 10da), and not to permit transmission of content data from the second terminal to the first terminal. Similarly, the session control unit 58 searches the transmission management table (refer to FIG. 7C) by using a set of the state information items "TRANSFERRING" and "RECEIVING" of the terminals (10db, 10da) of the read state information as a search key and reads corresponding transmission availability information "BIDIRECTIONAL TRANSMISSION IS AVAILABLE" and quality information "LOW". Based on the read transmission availability information and the quality information, the session control unit 58 determines to permit bidirectional transmission of image data and audio data with low quality between the first terminal (transferring terminal 10db) and the second terminal (receiving terminal 10da).

The sending and receiving unit 51 of the management system 50 transmits control information indicating the determination by the session control unit 58 to the relay apparatus 30e (step S49). Upon receiving the control information, the relay apparatus 30e stores relaying information based on the control information in the volatile memory area of the relay apparatus 30e.

The relay apparatus 30e transmits to the terminal 10da the image data and the audio data with low quality of the content data received from the terminal 10aa based on the relaying information stored in the volatile memory area (step S50-1). Further, the relay apparatus 30e transmits to the terminal 10da the image data and the audio data with low quality of the content data received from the terminal 10db (step S50-2). Further, the relay apparatus 30e transmits to the terminal 10db the image data and the audio data with low quality of the content data received from the terminal 10da (step S50-3). With the above operations, communication between the terminals (10da, 10db) becomes available, referring to the content data transmitted by the terminal 10aa and the terminal (10db or 10da).

Figure 11:
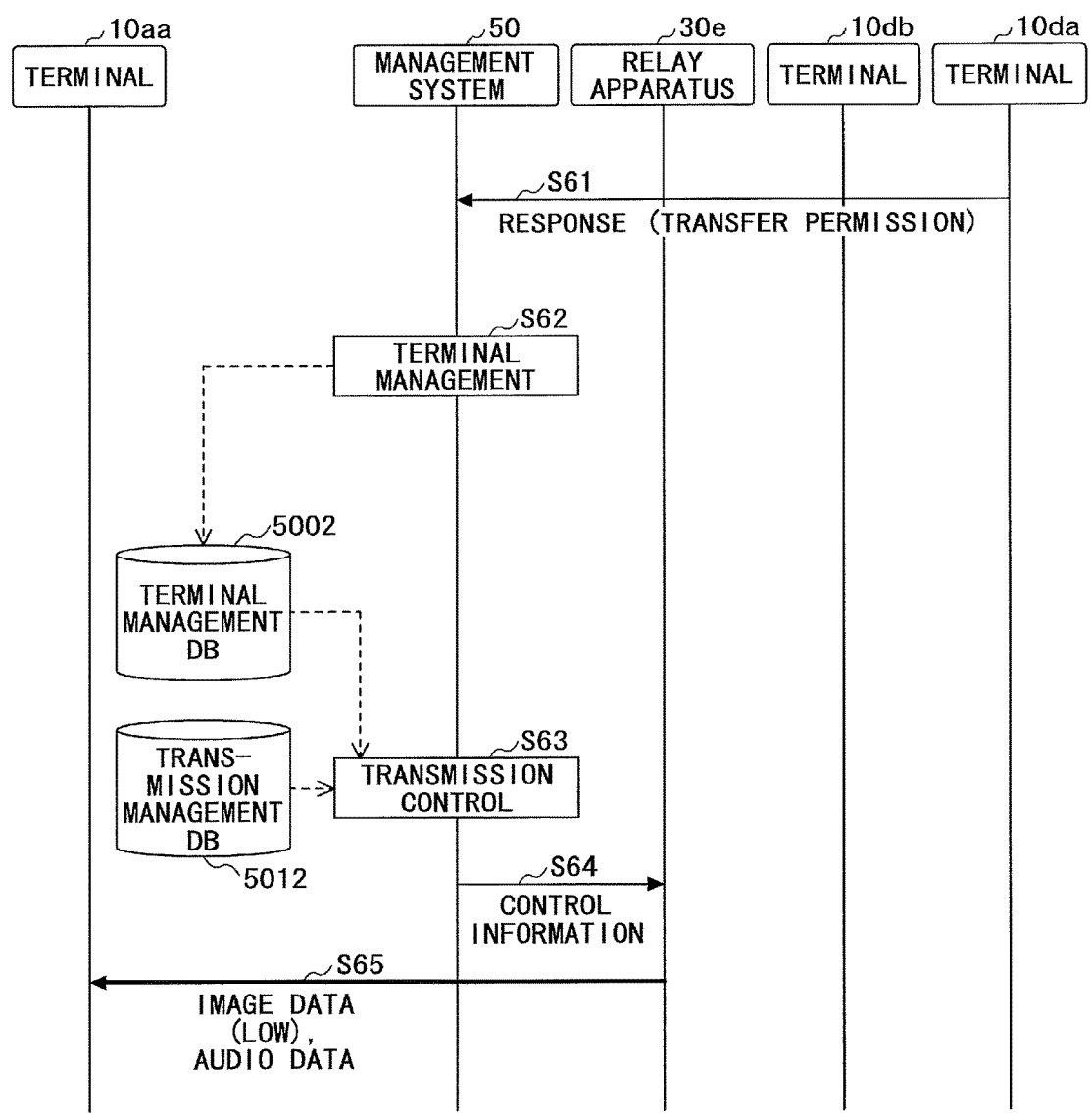
FIG. 11 is a sequence diagram illustrating a process of starting bidirectional communication between terminals.

Next, referring to FIG. 11, a process of, by the terminal 10da, accepting the transfer request will be described. FIG. 11 is a sequence diagram illustrating a process of starting a bidirectional communication between terminals.

When the operation input accepting unit 12 of the terminal 10da accepts an input of accepting the transfer request, the sending and receiving unit 11 transmits to the management system 50 a response indicating permission of the transfer request for transferring a call received from the terminal 10aa to the terminal 10da (step S61). In the response, communication IDs of terminals of the transfer requesting source and the transfer request destination (10db, 10da) are included (step S61).

Upon receiving the response indicating acceptance of the transfer request, the management unit 53 of the management system 50 controls the state of the terminal 10da according to the state transition rule indicated by the state transition diagram of FIG. 9 (step S62). In other words, the management unit 53 updates the state information associated with the communication ID of the transfer request destination terminal 10da from "RECEIVING" to "RESPONDING" in the terminal management table via the storing and reading unit 59. The updated terminal management table is shown in Table 6.

TABLE 6

| COMMUNICATION ID | DESTINATION NAME (TERMINAL NAME) | STATE INFORMATION |
|---|---|---|
| 01aa | TERMINAL AA | CALLING |
| 01da | TERMINAL DA | RESPONDING |
| 01db | TERMINAL DB | TRANSFERRING |
| ... | ... | ... |

When the state of the terminal 10da is updated, the session control unit 58 controls transmission of content data between the terminals (10da, 10aa) according to the updated states (step S63). In this case, the session control unit 58 searches the terminal management table (refer to Table 6) by using the communication IDs "01aa" and "01da" of the terminals (10aa, 10da) as search keys and reads the corresponding state information items "CALLING" and "RESPONDING". Next, the session control unit 58 searches the transmission management table (refer to FIG. 7C) by using a set of the read state information items "CALLING" and "RESPONDING" as a search key and reads corresponding transmission availability information "BIDIRECTIONAL TRANSMISSION IS AVAILABLE" and quality information "LOW". Based on the read transmission availability information and the quality information, the session control unit 58 determines to permit bidirectional transmission of image data and audio data with low quality between the first terminal (calling terminal 10aa) and the second terminal (responding terminal 10da).

The sending and receiving unit 51 of the management system 50 transmits control information indicating the determination by the session control unit 58 to the relay apparatus 30e (step S64). Upon receiving the control information, the relay apparatus 30e stores relaying information based on the control information in the volatile memory area of the relay apparatus 30e.

The relay apparatus 30e transmits to the terminal 10aa the image data and the audio data with low quality of the content data received from the terminal 10da based on the relaying information stored in the volatile memory area (step S65). With the above operations, content data transmission from the operator side terminal 10da to the guest side terminal 10aa is started, and thus, the guest and the operator can start talking.

Effect of Embodiment

The terminal management database (DB) 5002 (an example of a state management means) of the management system 50 (an example of a control system) controls state information indicating a state of the terminal 10. When the quest side terminal 10aa (an example of the first communication terminal) and the operator side terminal 10db (an example of the second communication terminal) communicate, the session control unit 58 (an example of a control means) determines whether content data should be transmitted from the terminal 10aa to the terminal 10db, and whether content data should be transmitted from the terminal 10db to the terminal 10aa based on a set of state information indicating a state of the terminal 10aa and state information indicating a state of the terminal 10db stored in the terminal management database (DB) 5002. When communication between the operator side terminal 10db and the guest side terminal 10aa is started, it becomes possible to start content data transmission from the operator side terminal 10db to the guest side terminal 10aa at a different timing from the timing when content data transmission from the guest side terminal 10aa to the operator side terminal 10db is started.

The transmission management database (DB) 5012 (an example of a transmission management means) of the management system 50 stores transmission availability information indicating availability of content data transmission from the first terminal 10 to the second terminal 10 and transmission availability information indicating availability of content data transmission from the second terminal 10 to the first terminal 10 by associating the transmission availability information with the set of the state information indicating the state of the first terminal 10 and the state information indicating the state of the second terminal 10. The session control unit 58 controls content data transmission based on the transmission availability information associated with the set of the state information indicating the state of the terminal 10aa and the state information indicating the state of the terminal 10db in the transmission management database (DB) 5012. With the above operation, it is possible for the management system 50 to determine content data transmission availability in each direction between the terminals 10.

When content data are transmitted between the terminal 10aa and the terminal 10db, the session control unit 58 controls quality of the content data transmitted between the terminal 10*aa* and the terminal 10*db* based on the set of the state information indicating the state of the terminal 10*aa* and the state information indicating the state of the terminal 10*db* stored in the terminal management database (DB) 5002. In other words, it is possible for the management system 50 to control quality of the transmitted content data according to the set of the states of the terminal (10*aa*, 10*db*).

In this case, the transmission management database (DB) 5012 (an example of a quality management means) of the management system 50 stores quality information indicating the quality of content data associated with the set of the state information indicating the state of the first terminal 10 and the state information indicating the state of the second terminal 10. The session control unit 58 controls the quality of the content data transmitted between the terminals (10*aa*, 10*db*) based on the quality information associated with the set of the state information indicating the state of the terminal 10*aa* and the state information indicating the state of the terminal 10*db* in the transmission management database (DB) 5012.

When the terminals (10*aa*, 10*db*, 10*da*) communicate, the session control unit 58 determines whether content data should be transmitted from the terminal 10*aa* to the terminal 10*da*, and whether content data should be transmitted from the terminal 10*da* to the terminal 10*aa* based on a set of state information indicating a state of the terminal 10*aa* and state information indicating a state of the terminal 10*da* stored in the terminal management database (DB) 5002. Further, the session control unit 58 determines whether content data should be transmitted from the terminal 10*db* to the terminal 10*da*, and whether content data should be transmitted from the terminal 10*da* to the terminal 10*db* based on a set of state information indicating a state of the terminal 10*db* and state information indicating a state of the terminal 10*da* stored in the terminal management database (DB) 5002. With the above operation, in a received call transferring process, for example, when two or more operator side terminals (10*da*, 10*db*) and the guest side terminal 10*aa* communicate, it becomes possible for different pairs of the terminals 10 to start content data transmission at different timings.

Supplementary Description of Embodiments

It should be noted that the management system 50 in the above embodiments may include a single computer, or include two or more computers to which corresponding units (functions or means) may be arbitrarily assigned.

Further, a recording medium in which a terminal program, a relay apparatus program, and a management system program of the communication system 1 are stored, an HD 204 in which the above programs are stored, and a program providing system 90 including the HD 204 can be used for providing the programs as program products for users in the country or abroad.

In the communication system 1, the "video conference" is used as a term which can be replaced with "TV conference".

Further, in the above communication system 1, as an example of the communication system 1, a case of video conference system has been described, but the case is not limited to it.

The communication system 1 may be, for example, an audio conference system or a personal computer (PC) screen sharing system.

Further, the communication system 1 may be a communication system of an Internet protocol (IP) telephone, an Internet phone, or a mobile telephone.

In the above cases, for example, the terminal 10 corresponds to a phone such as a mobile telephone terminal.

Further, in the above embodiments, image data and audio data are described as examples of content data, but the content data are not limited to image data and audio data. It should be noted that it is preferable that the content data are data used for realizing real-time communication. As the data used for realizing real-time communication, streaming data can be listed including screen sharing data, messages, stroke data, operation data, or the like, other than image data including a still image and a video image, or audio data.

It should be noted that the terminals 10 may be used not only for communication between offices or communication between different rooms in the same office, but also for communication in the same room, communication between indoors and outdoors, or communication outdoors. In the case where terminals 10 are used outdoors, wireless communication is performed by using a mobile telephone communication network, or the like. Further, in the above embodiments, the communication system 1 is used for, but not limited to, video conferencing. The communication system 1 may also be used for a meeting or a calling between family members, friends, or the like.

The present invention is not limited to the specifically described embodiments, and variations and modifications may be made without departing from the scope of the present invention.

The present application is based on and claims the benefit of priority of Japanese Priority Application No. 2015-030762 filed on Feb. 19, 2015, the entire contents of which are hereby incorporated herein by reference.

What is claimed is:

1. A control system, comprising:
processing circuitry configured to
control state information indicating a state of a communication terminal;
determine, when a first communication terminal and a second communication terminal communicate, whether first content data should be transmitted from the first communication terminal to the second communication terminal and whether second content data should be transmitted from the second communication terminal to the first communication terminal, based on a set of state information indicating a first state of the first communication terminal and indicating a second state of the second communication terminal; and
control transmission availability information that indicates a first transmission availability of the first content data from the first communication terminal to the second communication terminal and a second transmission availability of the second content data from the second communication terminal to the first communication terminal, the transmission availability information being associated with the set of the state information, wherein
transmission of the first content data and the second content data is based on the transmission availability information associated with the set of the state information.

2. The control system according to claim 1, wherein the processing circuitry controls, when one of the first content data and the content data is transmitted between the first communication terminal and the second communication terminal, quality of the one transmitted between the first communication terminal and the second communication terminal based on the set of the state information.

3. The control system according to claim 2, wherein the processing circuitry is configured to
control quality information indicating the quality of the first content data and the second content data associated with the set of the state information, and
controls the quality of the one transmitted between the first communication terminal and the second communication terminal based on the quality information associated with the set of the state information.

4. A control system, comprising:
state management circuitry configured to control state information indicating a state of a communication terminal; and
control circuit configured to
when a first communication terminal, a second communication terminal, and a third communication terminal communicate,
determine whether first content data should be transmitted from the first communication terminal to the third communication terminal and whether second content data should be transmitted from the third communication terminal to the first communication terminal, based on a set of state information indicating a first state of the first communication terminal and indicating a second state of the third communication terminal, and
determine whether third content data should be transmitted from the second communication terminal to the third communication terminal and whether fourth content data should be transmitted from the third communication terminal to the second communication terminal based on the set of the state information, the set of the state information further indicating a third state of the second communication terminal and indicating a fourth state the third communication terminal; and
control transmission availability information that indicates a first transmission availability of the first content data from the first communication terminal to the third communication terminal, a second transmission availability of the second content data from the third communication terminal to the first communication terminal, a third transmission availability of the third content data from the second communication terminal, to the third communication terminal, and a fourth transmission availability from the third communication terminal to the second communication terminal, the transmission availability information being associated with the set of the state information, wherein
transmission of the first content data, the second content data, the third content data and the fourth content data is based on the transmission availability information associated with the set of the state information.

5. A communication system, comprising:
the control system according to claim 1;
the first communication terminal; and
the second communication terminal.

6. A communication system, comprising:
the control system according to claim 4;
the first communication terminal;
the second communication terminal; and
the third communication terminal.

7. A control method performed by a control system, the control method comprising:
controlling, by processing circuitry of the control system, state information indicating a state of a communication terminal;
determining, by the processing circuitry when a first communication terminal and a second communication terminal communicate, whether first content data should be transmitted from the first communication terminal to the second communication terminal and whether second content data should be transmitted from the second communication terminal to the first communication terminal, based on a set of the state information indicating a first state of the first communication terminal and indicating a second state of the second communication terminal; and
controlling, by the processing circuitry transmission availability information that indicates a first transmission availability of the first content data from the first communication terminal to the second communication terminal and a second transmission availability of the second content data from the second communication terminal to the first communication terminal, the transmission availability information being associated with the set of the state information, wherein
transmission of the first content data and the second content data is based on the transmission availability information associated with the set of the state information.

8. A control method performed by a control system, the control method comprising:
controlling, by processing circuitry of the control system, state information indicating a state of a communication terminal;
when a first communication terminal, a second communication terminal, and a third communication terminal communicate,
determining, by the processing circuitry, whether first content data should be transmitted from the first communication terminal to the third communication terminal and whether second content data should be transmitted from the third communication terminal to the first communication terminal, based on a set of the state information indicating a first state of the second communication terminal and indicating a second state of the third communication terminal, and
determining, by the processing circuitry, whether third content data should be transmitted from the second communication terminal to the third communication terminal and whether fourth content data should be transmitted from the third communication terminal to the second communication terminal, based on the set of the state information, the set of the state information indicating a third state of the first communication terminal and indicating a fourth state of the third communication terminal; and
controlling, by the processing circuitry, transmission availability information that indicates a first transmission availability of the first content data from the first communication terminal to the third communication terminal, a second transmission availability of the second content data from the third communication terminal to the first communication terminal, a third transmission availability of the third content data from the second communication terminal to the third communication terminal, and a fourth transmission availability from the third communication terminal to the second communication terminal, the transmission availability information being associated with the set of the state information, wherein
transmission of the first content data the second content data, the third content data and the fourth content data is based on the transmission availability information associated with the set of the state information.

9. A non-transitory computer-readable recording medium that stores computer-executable instructions which, when executed by the processing circuitry, cause the control system to perform the method according to claim 7.

10. A non-transitory computer-readable recording medium that stores computer-executable instructions which, when executed by the processing circuitry, cause the control system to perform the method according to claim 8.

\* \* \* \* \*